United States Patent [19]

Yasuda

[11] Patent Number: 5,057,863

[45] Date of Patent: Oct. 15, 1991

[54] VARIABLE MAGNIFICATION OPTICS FOR AN IMAGE FORMING APPARATUS

[75] Inventor: Yuji Yasuda, Tokyo, Japan

[73] Assignee: Ricoh Company, Ltd., Tokyo, Japan

[21] Appl. No.: 434,020

[22] Filed: Nov. 9, 1989

[30] Foreign Application Priority Data

Nov. 9, 1988 [JP] Japan ................................ 63-283391
Nov. 9, 1988 [JP] Japan ................................ 63-283393
Apr. 28, 1989 [JP] Japan ................................ 1-111637

[51] Int. Cl.[5] ........................ G03B 27/34; G03B 27/40; G03B 27/70

[52] U.S. Cl. ........................................ 355/57; 355/60

[58] Field of Search ........................ 355/55, 56, 57, 60

[56] References Cited

U.S. PATENT DOCUMENTS 3,901,586 8/1975 Suzuki et al. ........................ 355/57
4,453,824 6/1984 Miyake et al. ........................ 355/57
4,572,658 2/1986 Suzuki et al. ........................ 355/57
4,647,191 3/1987 Kunikawa et al. .................. 355/57
4,766,466 8/1988 Kawai et al. .......................... 355/57
4,800,414 1/1989 Takeda ................................ 355/57

*Primary Examiner*—Monroe H. Hayes
*Attorney, Agent, or Firm*—Oblon, Spivak, McClelland, Maier & Neustadt

[57] ABSTRACT

Variable magnification optics for an image forming apparatus has a plurality of optical members, especially a first mirror and a lens located at the rear of the mirror, which are movable in association with each other and over a minimum of distance. This reduces the exclusive space which the optics occupies in the apparatus and, therefore, the overall dimensions of the apparatus. The mirror and lens which are interlocked with each other do not need independent drive lines, whereby the overall dimensions of the apparatus are further reduced.

13 Claims, 12 Drawing Sheets

VARIABLE MAGNIFICATION OPTICS FOR AN IMAGE FORMING APPARATUS

BACKGROUND OF THE INVENTION

The present invention relates to variable magnification optics for use in an electrophotographic copier, facsimile machine, laser printer or similar image forming apparatus and, more particularly, to variable magnification optics constructed to promote accurate and smooth movement of various optical members thereof in the event of a change of magnification.

Many modern electrophotographic copiers, for example, are provided with a magnification changing mechanism for enlarging or reducing a document image to be reproduced. The magnification changing mechanism includes various optical members such as a lens and mirrors which are movable to set up a desired magnification. The optical members have to be moved over a substantial distance in the event of, among others, reduction, so that the optics occupies much of a limited space available in the copier. This translates into an increase in the overall dimensions of the copier and thereby degrades the manipulability. While the optical members have to be moved accurately and smoothly in the event of magnification change which may be either enlargement or reduction, variable magnification optics capable of sufficiently meeting such a need have not yet been reported.

SUMMARY OF THE INVENTION

It is therefore an object of the present invention to provide variable magnification optics for an image forming apparatus which allows optical members thereof to move to positions for setting up a predetermined magnification change ratio without increasing the overall dimensions of the apparatus.

It is another object of the present invention to provide variable magnification optics for an image forming apparatus which controls the movement of optical members thereof with accuracy.

It is another object of the present invention to provide variable magnification optics for an image forming apparatus which allows a mirror supported by a cantilevered unit to move smoothly.

It is another object of the present invention to provide generally improved variable magnification optics for an image forming apparatus.

In accordance with the present invention, optics for an image forming apparatus having optical members for projecting a reflection from an image surface of a document onto a photoconductive element and comprising a plurality of mirrors and a lens interposed between the mirrors, and displacing the optical members in the event of a change of magnification comprises a first mirror for reflecting the reflection from the document prior to the other mirrors, a first mirror support member supporting the first mirror such that the first mirror is movable parallel to an optical axis of the reflection, and a lens support member supporting the lens, which is located rearwardly of the first mirror support member, such that the lens is movable in a direction of movement of the first mirror support member by an amount associated with a ratio which is produced from an amount of movement of the first mirror support member.

Also, in accordance with the present invention, optics for an image forming apparatus having optical members for projecting a reflection from an image surface of a document onto a photoconductive element and comprising two mirrors and a lens interposed between the two mirrors, and displacing the optical members in the event of a change of magnification comprises a first mirror for reflecting the reflection from the document prior to the other mirror, a first mirror support member supporting the first mirror such that the first mirror is movable parallel to an optical axis of the reflection, a lens support member supporting the lens, which is located rearwardly of the first mirror support member, such that the lens is movable in a direction of movement of the first mirror support member by an amount associated with a ratio which is produced from an amount of movement of the first mirror support member, a second mirror located adjacent to the photoconductive element with respect to the lens support member, a second mirror support member supporting the second mirror and movable perpendicularly to a surface of the second mirror, and an interlocking device driven by the first mirror support member for displacing the second mirror support member perpendicularly to the surface of the second mirror.

Further, in accordance with the present invention, optics for an image forming apparatus having optical members for projecting a reflection from an image surface of a document onto a photoconductive element and comprising a plurality of mirrors and a lens interposed between the mirrors, and displacing the optical members in the event of a change of magnification comprises a first mirror for reflecting the reflection from the document prior to the other mirrors, a first mirror support member supporting the first mirror such that the first mirror is movable parallel to an optical axis of the reflection, a lens support member supporting the lens, which is located rearwardly of the first mirror support member, such that the lens is movable in a direction of movement of the first mirror support member by an amount associated with a ratio which is produced from an amount of movement of the first mirror support member, and a first mirror support unit comprising a casing which accommodates the first mirror and the lens, the first mirror support unit being undulated for light interception at a surface thereof where the lens is located.

Further, in accordance with the present invention, optics for an image forming apparatus for projecting a reflection from an image surface of a document onto a desired surface through a plurality of mirrors and a lens interposed between the mirrors comprises a mirror support member movable between a position where the mirrors are held in a predetermined position and a position where the mirrors are removable, resilient members affixed to a mirror mounting surface of the mirror support member at apexes of an imaginary triangle and abutting against a back of one of the mirrors associated therewith for biasing the mirror away from the mirror mounting surface, and a restricting member provided on a member which faces the resilient members with the intermediary of the mirror and engageable with a reflecting surface of the mirror for setting an angle of inclination of the mirror being biased by the resilient members.

Further, in accordance with the present invention, a position adjusting method for finely adjusting one position to cause the one position into correspondence with the other position and then fixing the one position or the other position by a fastening mechanism comprises the steps of forming a plurality of slots through a member to be adjusted which is located at either one of the one position and other position, the slots each extending in an intended direction of adjustment, passing each of fixing members through respective one of the slots, the fixing members comprising a guide member and a fastening member mounted on a stationary portion to which the member to be adjusted is affixed, urging the member to be adjusted against a surface of the stationary portion by a pressing member which is provided on the guide member, and causing the member to be adjusted in the intended direction of adjustment while being urged against the surface of the stationary member even when the fixing members are loosened.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, drawbacks particular to prior art variable magnification optics will be discussed in detail.

Figure 1:
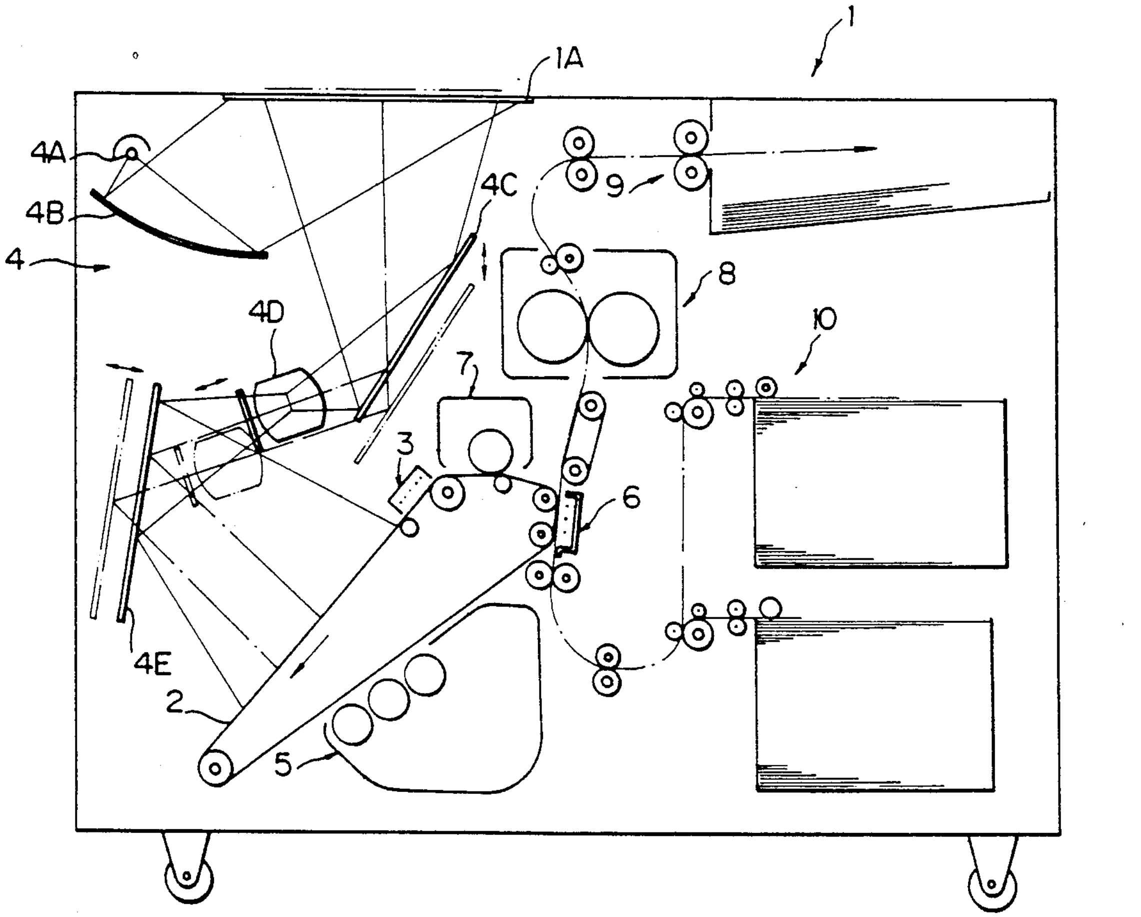
FIG. 1 is a sectional side elevation of an electrophotographic copier which belongs to a family of image forming apparatuses of the type having variable magnification optics.

Referring to FIG. 1 of the drawings, an electrophotographic copier which is a specific form of an image forming apparatus with variable magnification optics is shown and generally designated by the reference numeral 1. As shown, the copier 1 has a photoconductive element in the form of a belt 2 which is movable in a direction indicated by an arrow in the figure. Arranged around the belt 2 are a main charger 3, optics 4, a developing unit 5, and a transfer and separation unit 6, as named in the direction of rotation of the belt 2. A cleaning unit 7 is located downstream of the transfer and separation unit 6 with respect to the direction of rotation of the belt 2. A fixing unit 8 and a paper discharging device 9 are positioned in the vicinity of the transfer and separation unit 6. The reference numeral 10 designates a paper feeder. The optics 4 has a lamp 4A and a mirror 4B near a glass platen 1A which is mounted on the top of the body of the copier 1, and a first mirror 4C, a lens 4D and a second mirror 4E which steer a reflection from the glass platen 1A to the belt 2.

In the optics 4, a displacement ΔL which is required of an optical member for changing magnification is expressed as:

$$\Delta L \simeq (1-1/m)f$$

where f is the focal distance of a lens, and m is a magnification.

Figure 2:
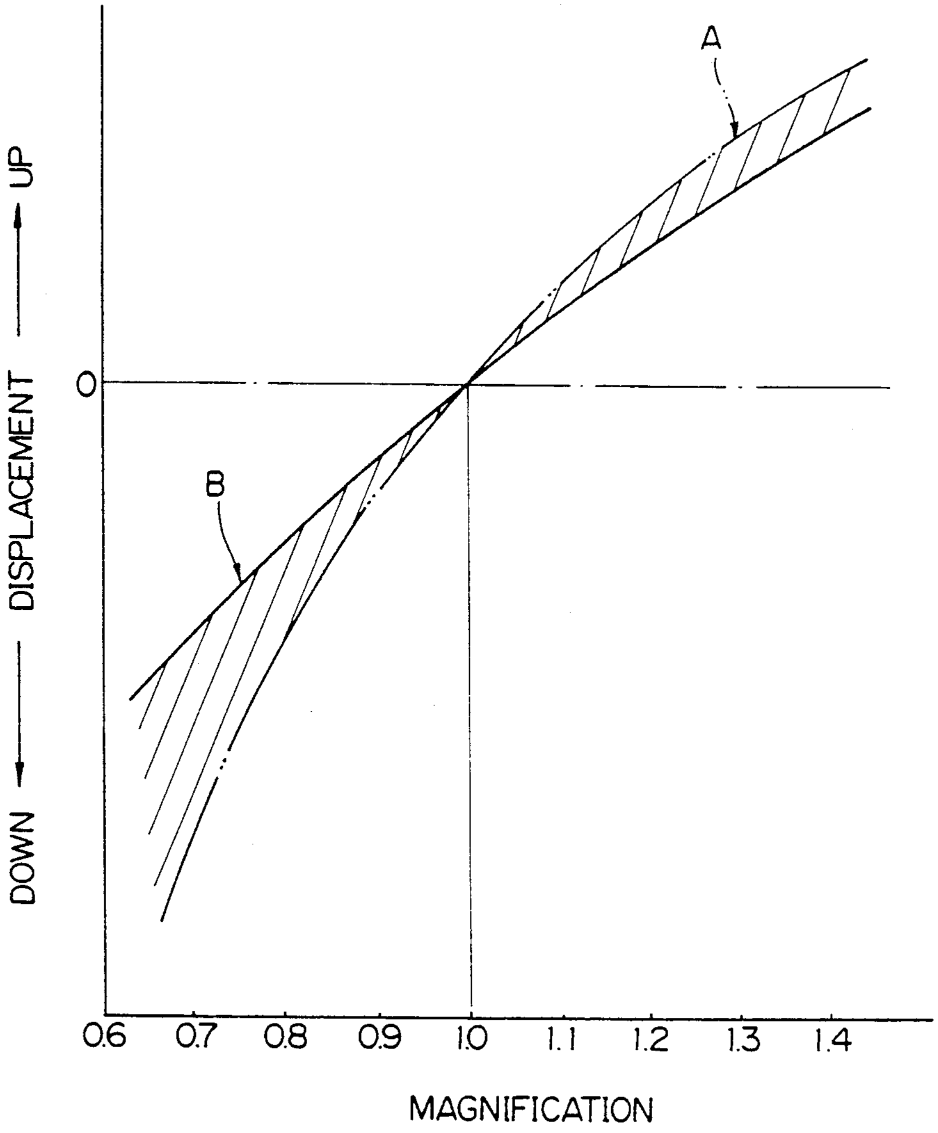
FIG. 2 is a graph showing a relationship between the displacement of optical members and the magnification.

FIG. 2 is a graph representative of such displacements of an optical member. In the graph, the ordinate indicates the amounts by which an optical member is moved up and down away from a reference position "0" which is associated with 1:1 magnification, while the abscissa indicates magnifications. A dash-and-dots curve A in FIG. 2 shows the results which are derived from the above equation. As shown, an optical member has to be moved over a substantial distance in the event of reduction.

Assuming that the first mirror 4C is the optical member movable as stated above, it has to be moved downward toward the belt 2 beyond the position which is indicated by a dash-and-dots line in FIG. 1 and adapted for reduction. This severely restricts the locations available for the main charger 3 and cleaning unit 7. Hence, the glass platen 1A has to be located at a higher level, i.e., further away from the belt 2. This increases the height of the copier 1 and thereby degrades the manipulability. When the lens 4D is moved instead of the mirror 4C for setting up a particular optical length associated with a magnification, it has to be moved to the left as viewed in FIG. 1 away from the position which is indicated by a dash-and-dots line and adapted for reduction. This brings about a fear that the lens 4D approaches the second mirror 4E so much that a projected image is partly lost due to the limited area of the mirror 4E. To eliminate such a fear, there has to be secured a space large enough to allow the mirror 4E to move to a position which accommodates the whole projected image in matching relation to the movement of the lens 4D. As a result, the dimension of the copier 1 as measured in the horizontal direction is increased to in turn increase the overall size of the copier 1.

The increase in the size of the copier 1 is ascribable to the mirror which reflects light having been focused by the lens 4D (mirror 4E in FIG. 1) and is moved parallel to the optical axis of the incident light. A space for allowing the mirror 4E to move in both of the horizontal and vertical directions along the angle of incidence of light is needed, thus the optics 4 require a substantial exclusive space in the copier 1.

Assume that the mirror 4E is moved by a belt, chain or similar elastic member, and that the initial position of the mirror 4E is sensed through the elastic member. Then, the sensed initial position would be inaccurate due to the stretch of the elastic member and would thereby render the movement of the mirror 4E inaccurate.

The first mirror 4C may be movably supported by a cantilevered unit, for example. This kind of scheme is disadvantageous, however, because the cantilevered support unit is apt to tilt in the widthwise direction due to shaking ascribable to errors particular to assembly, preventing the mirror 4C from being moved smoothly.

Figure 3:
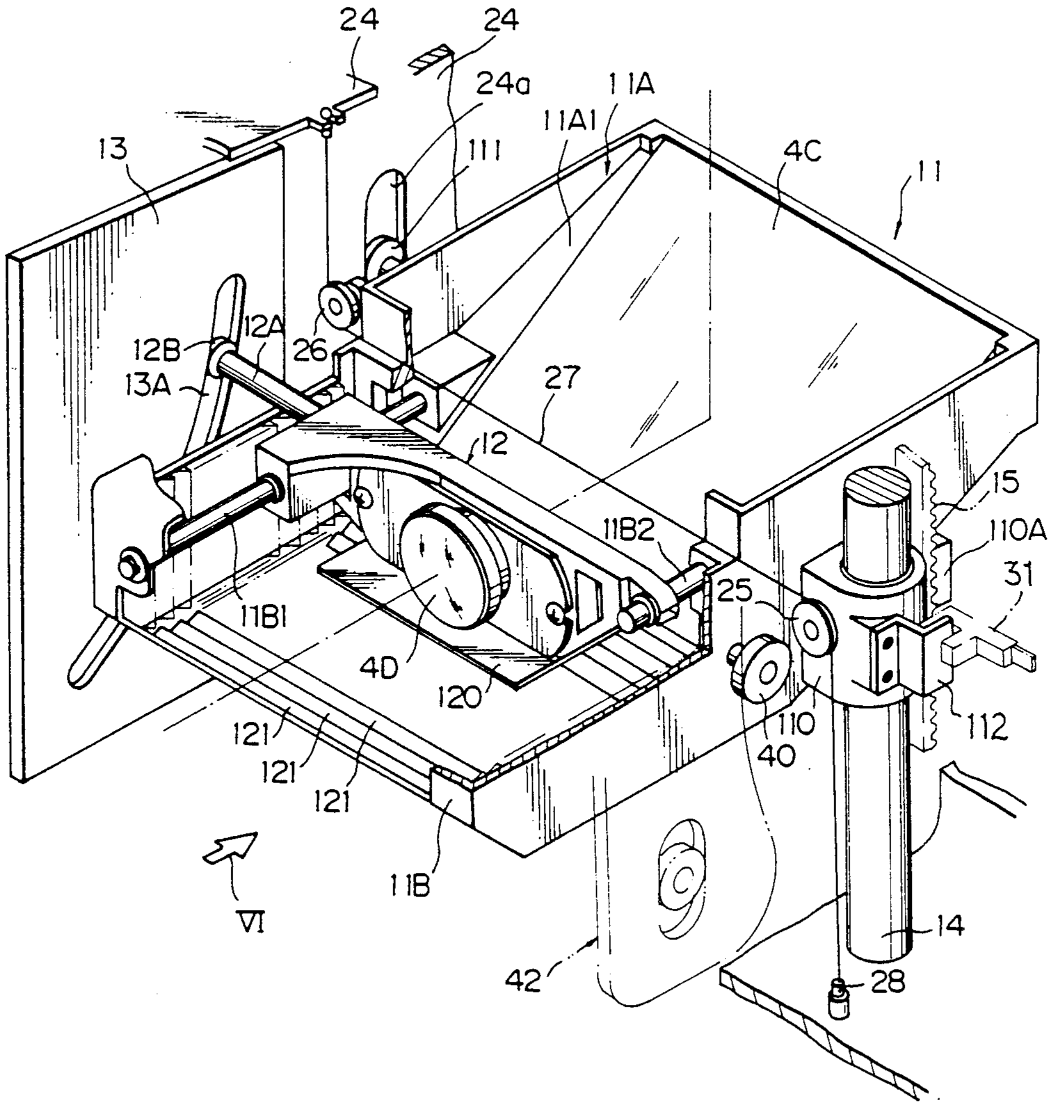
FIG. 3 is a fragmentary perspective view of optics embodying the present invenion, showing a structure for supporting a first mirror.

Referring to FIG. 3, variable magnification optics embodying the present invention is shown. In the figure, the same components and structural elements as those shown in FIG. 1 are designated by like reference numerals. The illustrative embodiment is characterized in that a lens is movable in association with a first mirror, in that a second mirror is movable in association with the first mirror and in a direction perpendicular to the surface thereof, and in that a unit supporting the first mirror is adjustable as to its horizontal position.

Figure 4:
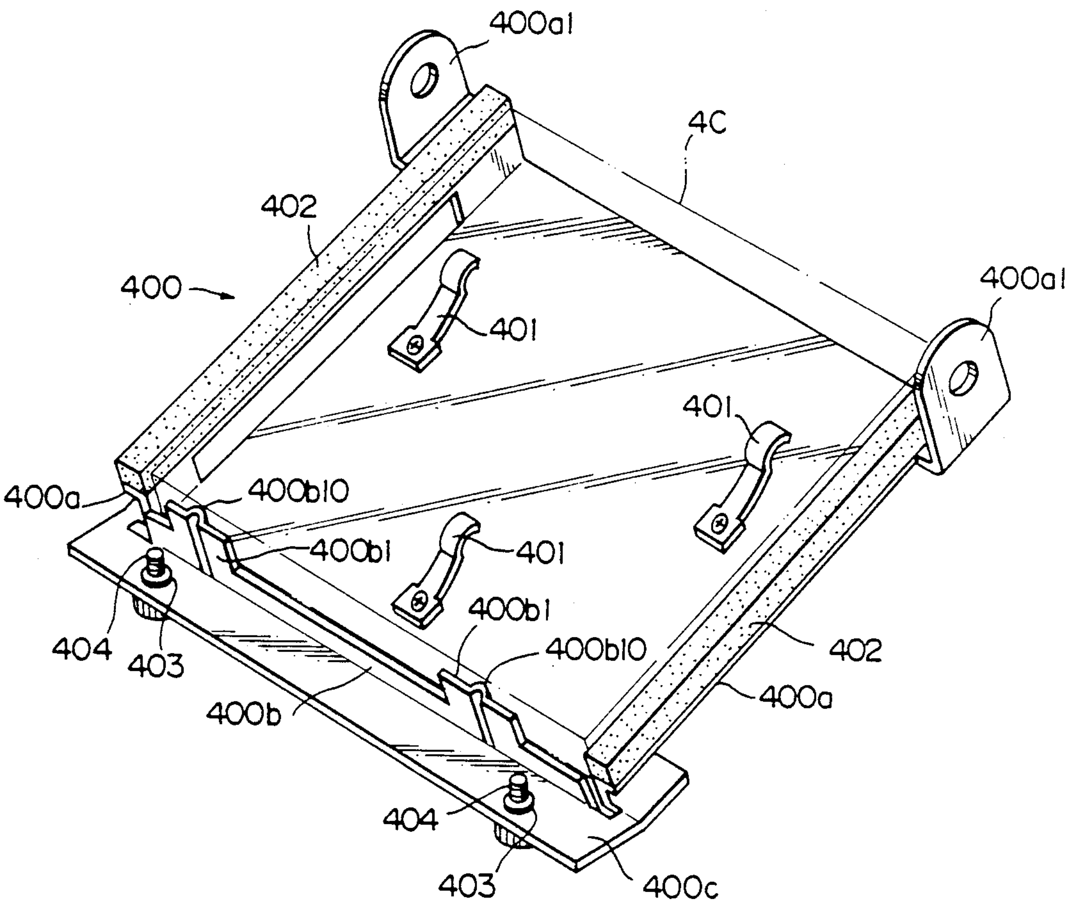
FIG. 4 is a perspective view showing a mirror mount portion included in the structure of FIG. 3 in detail.

Specifically, a first mirror 4C is mounted on a support unit 11 and inclined by an angle capable of setting up a predetermined optical path. The support unit 11 is implemented as a casing having a mirror mount portion 11A and a lens mount portion 11B which retains a lens 4D as will be described. The mirror mount portion 11A has an inclined bottom wall 11A1 on which the first mirror 4C is rigidly mounted. More specifically, the first mirror 4C is affixed to a mirror cassette 400, FIG. 4, and then set on the inclined bottom wall 11A1 of the support unit 11. As shown in FIG. 4, the mirror cassette 400 has a generally box-like configuration which is so removed around the mirror 4C as to expose the upper end and reflecting surface of the mirror 4C. A plurality of leaf springs 401 are affixed to the bottom of the mirror cassette 400 to constantly urge the mirror 4C away from the bottom. The support unit 11 has retainers, not shown, for preventing the mirror 4C from jumping out of the cassette 400 due to the force of the leaf springs 401.

The box-like mirror cassette 400 has a pair of elongate upright walls 400*a* at opposite widthwise edges thereof. Each of the upright walls 400*a* has a channel-like cross-section, and a screening member 402 made of forming resin, for example, is fitted on the top of each wall 400*a*. Flanges 400*a*1 each having an aperture extend from the individual walls 400*a* in the vicinity of the upper edge of the mirror 4C. The support unit 11 has a shaft, not shown, which is passed through the apertures of the flanges 400*a*1, whereby the mirror cassette 400 is rotatably retained by the support unit 11.

The mirror cassette 400 also has an upright wall 400*b* at the lower or free end thereof. The wall 400*b* is provided with projections 400*b*1 at suitable positions thereof, i.e., at equally spaced locations along the width in the illustrative embodiment. Each projection 400*b*1 has a height substantially equal to the thickness of the mirror 4C and has a bead 400*b*10 which protrudes toward the edge of the mirror 4C. The beads 400*b*10 extends in the thicknesswise direction of the mirror 4C to reduce the resistance to the mirror 4C in the event when the mirror 4C is mounted.

The mirror cassette 400 further has a flat portion 400*c* at the free end thereof. Screws 404 are provided on the flat portion 400*c* at suitable locations in the widthwise direction of the mirror 4C, i.e., two symmetrical positions in the illustrative embodiment. An E-ring is associated with each screw 404 for preventing the latter from slipping out of the flat portion 400*c*. The screws 404 are individually mated with screw-threads, not shown, which are formed in the support unit 11, whereby the mirror cassette 400 is securely fixed to the support unit 11. The mirror 4C, therefore, is adjustable by removing the screws 404 from the screw-threads and then rotating the mirror cassette 400 to expose the mirror 4C.

The lens mount portion 11B contiguous with the mirror mount portion 11A has a pair of guide rods 11B1 and 11B2 which extend parallel to the optical axis of the mirror 4C. The guide rods 11B1 and 11B2 are each inserted at one end thereof into a part of the bottom wall 11A1 of the mirror mount portion 11A and an engaging portion which is provided in a wall of the portion 11A. A lens holder 12 is slidably mounted on the guide rods 11B1 and 11B2 and have widthwise ends thereof defined by the latter. A lens 4D is mounted on the lens holder 12 at the intermediate between the guide rods 11B1 and 11B2. A shaft 12A extends sideways from one of the opposite sides of the lens holder 12 and carries a rotatable cam follower 12B at its end. A cam plate 13 is mounted on a stationary member of a copier body and formed with a cam slot 13A therethrough. The cam follower 12B is received in the cam slot 13A, so that the lens holder 12 is movable along the configuration of the slot 13A.

The cam slot 13A has a configuration, inclusive of a stroke, selected to satisfy the condition which is shown in FIG. 2 and will be described hereinafter. Specifically, in the illustrative embodiment, the displacement of the support unit 11 from the 1:1 magnification position is selected to be $\Delta L' = g(m)$, and the support unit 11 is moved on the basis of the function of magnification. The displacements actually obtainable with the function are represented by a solid curve B in FIG. 2. In response to the displacement of the support unit 11, the lens 4D is also moved over a particular range as indicated by hatching in FIG. 2. More specifically, the mirror 4C and the lens 4D are moved in association with each other for the purpose of eliminating the previously discussed drawbacks particular to the movement of the first mirror only or that of the lens only. For reduction, for example, the displacement of the mirror 4C is selected to be 40% to 60% of the conventional displacement which is indicated by the curve A in FIG. 2, while a displacement substantially equal to such a displacement is assigned to the lens 4D. For enlargement, a displacement which is 100% to 120% of the conventional displacement is selected. When the configuration of the cam slot 13A is determined based on the above conditions, the displacement of the mirror 4C and that of the lens 4D will be successfully reduced to thereby prevent the copier from becoming bulky.

Figure 5:
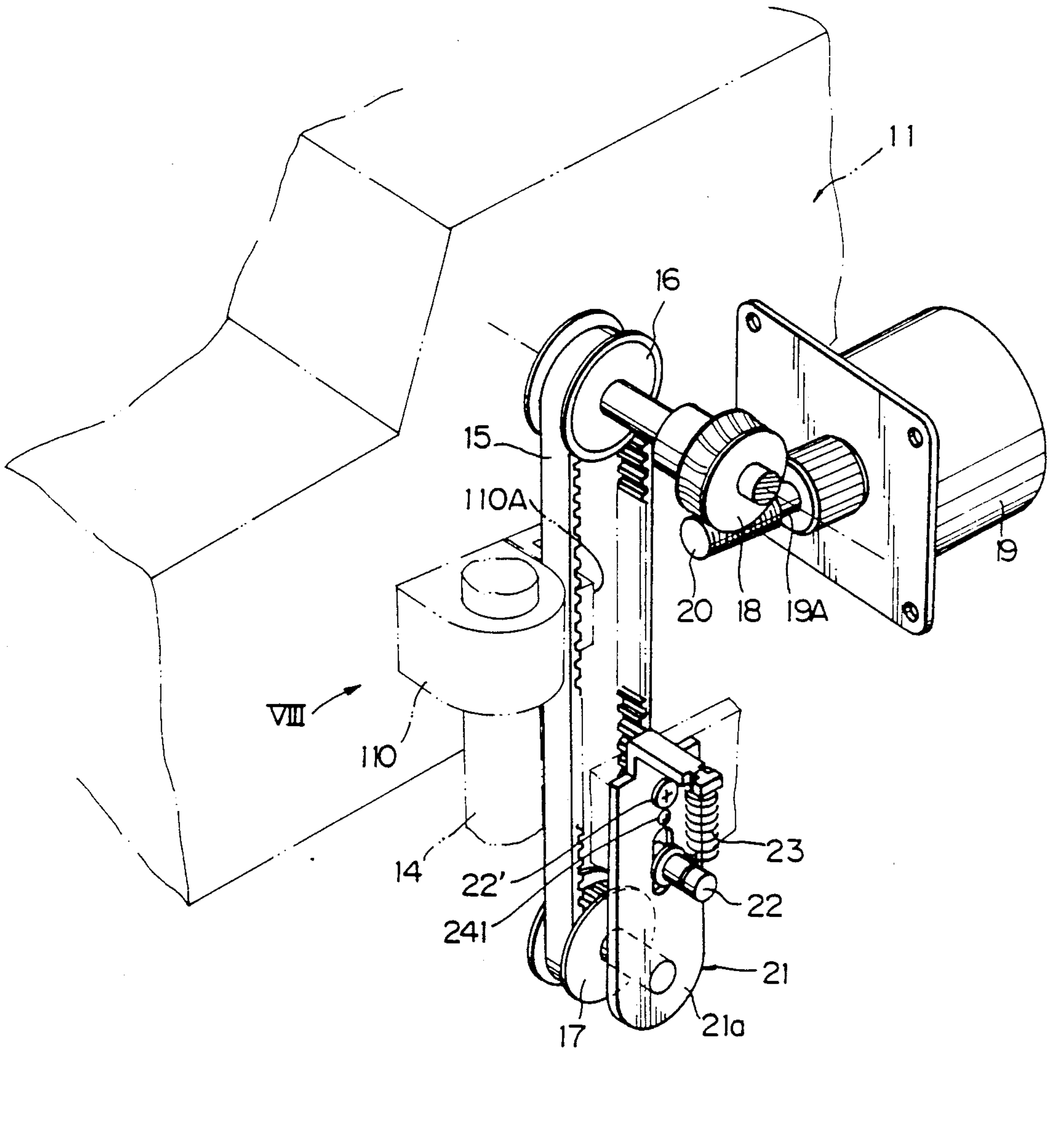
FIG. 5 is a perspective view of a drive mechanism also included in the structure of FIG. 3.

Referring to FIG. 5, a mechanism for moving the support unit 11 as stated above is shown. As shown, the support unit 11 has a boss 110 on a side wall thereof. A stationary shaft 14 extends vertically within the copier body and is received in the boss 110, so that the support unit 11 is bodily movable up and down on and along the shaft 14. A toothed member 110A is affixed to the side wall of the support unit and faces the boss 110. A cog belt 15 is meshed with the toothed member 110A and, therefore, backed up by the boss 110. This insures firm engagement of the cog belt 15 with the toothed member 110A. The cog belt 15 is passed over a pair of pulleys 16 and 17 to be driven by the latter. One pulley 16 is mounted on the same shaft as a worm wheel 18 which is held in mesh with a worm gear 20. The worm gear 20 is mounted on the output shaft 19A of a motor 19 which is a reversible stepping motor.

The cog belt 15 is held under tension by a member 21. This member 21 is made up of a support plate 21*a* which rotatably supports the shaft of the other pulley 17, a tension spring 23 anchored at one end to the upper end of the support plate 21*a* and at the other end to a pin 22, and a screw 241 for fixing the support plate 21*a* after the latter has been positioned in the vertical direction. The pin 22 is studded on a stationary member of the copier together with a pin 22'. The tension spring 23 constantly urges the pulley 17 downward through the support plate 21*a*, thereby preventing the cog belt 15 from slackening.

The support unit 11 is cantilevered by the shaft 14 through the boss 110 at one side wall thereof, as previously stated. An eccentric sleeve 111 is mounted on a shaft which extends out from the other side wall of the support unit 11. The sleeve 111 is received in a vertical slot 24*a* which is formed through a stationary member 24 of the copier body. With such a configuration, the support member 11 is movable up and down as needed. The sleeve 111 may be rotated within the slot 24*a* to change the position of the above-mentioned other side wall of the support unit 11 and thereby to adjust the optical axis to the lens 4D.

Figure 6:
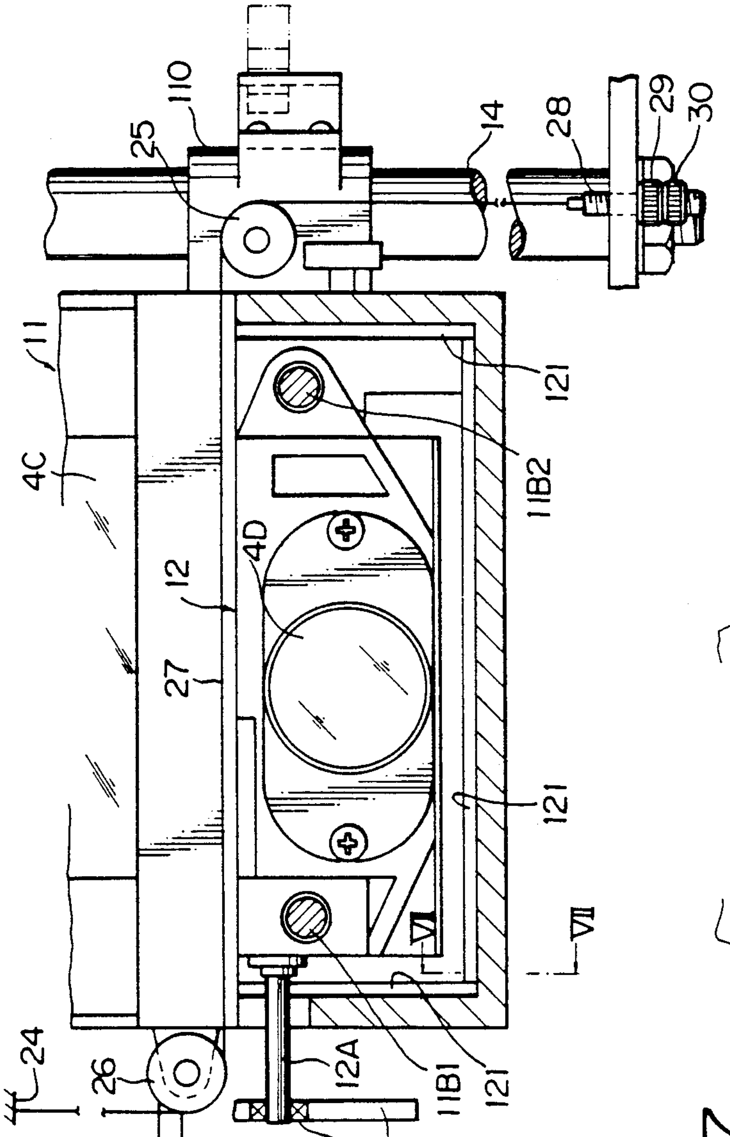
FIG. 6 is a view as seen in a direction indicated by an arrow IV in FIG. 3.

The support unit 11 having the above structure is not retained at the side opposite to the shaft 14, as stated above. In the illustrative embodiment, there is provided a structure for preventing the support unit 11 from sliding when not expected to do so. Specifically, as shown in FIGS. 3 and 6, pulleys 25 and 26 are provided on the opposite sides of the support unit 11. More specifically, the pulley 25 is mounted on the boss 110. A wire 27 is passed over the pulleys 25 and 26 in such a manner as not to interfere with the optical path which extends through the lens 4D. As shown in FIGS. 3 and 6, the wire 27 is retained at one end by a pin 28 which is studded on a stationary member of the copier body. The other end of the wire 27 is extended by way of the upper periphery of the pulley 25 and the lower periphery of the pulley 26 to the stationary member 24 of the copier body and anchored to the latter. In this construction, the support unit 11 is suspended by the stationary member 24 of the copier body at the side opposite to the side where the boss 110 is provided. As shown in FIG. 6, the outer periphery of the pin 28 is screw-threaded so that the pin 28 is adjustable in position along its axis. Therefore, any play or deformation of the support unit 11 can be removed to insure the expected movement of the support unit 11 in the vertical direction. In FIG. 6, the reference numerals 29 and 30 designate nuts for fixing the pin 28 in place.

Figure 7:
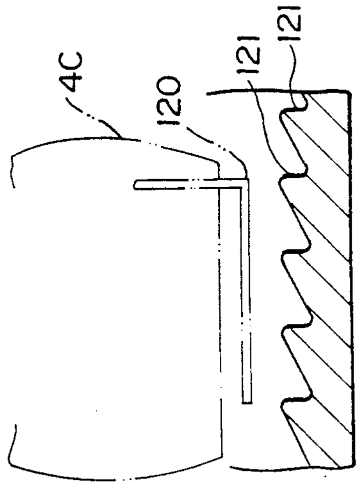
FIG. 7 is a section along line VII—VII of FIG. 6.

The lens mount portion 11B of the support unit 11 is provided with a structure for intercepting external light otherwise incident to the lens 4D. Specifically, as shown in FIG. 7, a screening plate 120 is mounted on the underside of the lens holder 12. Tooth-like projections 121 are formed on the inner periphery of the lens holder 11B in such a configuration that each tooth is inclined at, for example, a surface thereof which is substantially perpendicular to the direction of incidence of projected light and a surface opposite to and contiguous with that surface. The projections 121 block external light which may enter the lens holder 11B, thereby substantially preventing such light from leaking to the rear. To intercept external light more positively, the surface of the screening plate 120 which faces the projections 121 may be painted to reduce its reflectivity. The projections 121 may have any other desired shape such as a rectangle or a triangle so long as they have small tips and define deep recesses.

Figure 8A:
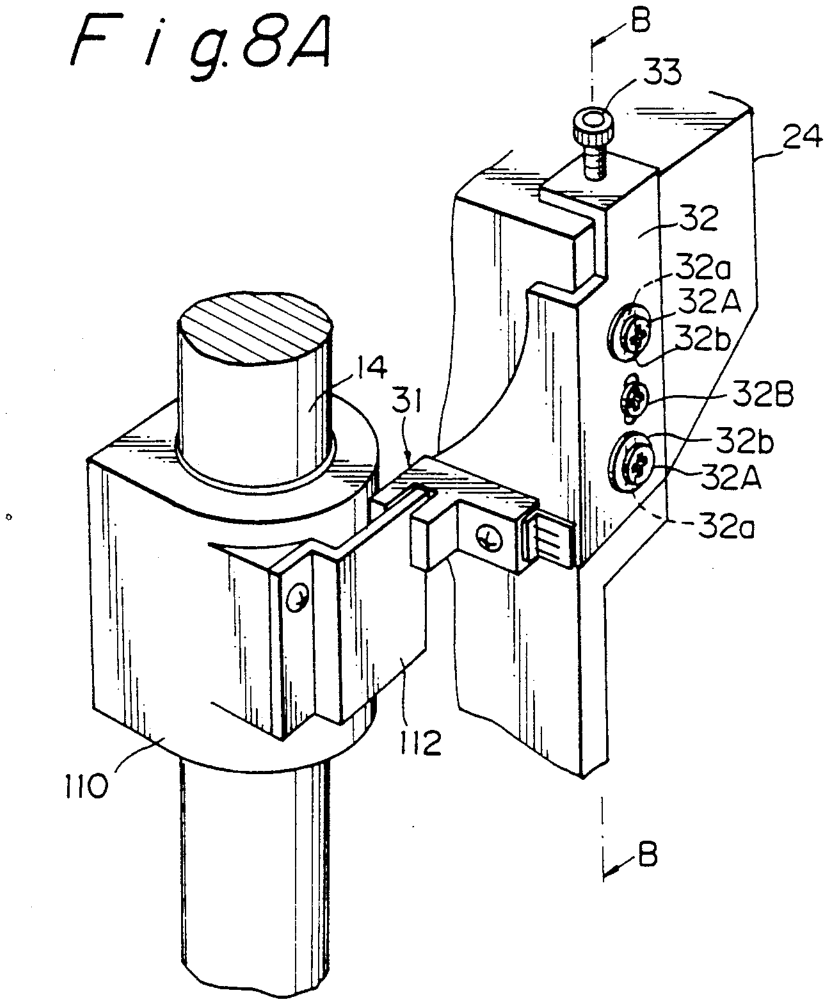
FIG. 8A is a perspective view of a part of FIG. 5 which is labelled VIII.
Figure 8B:
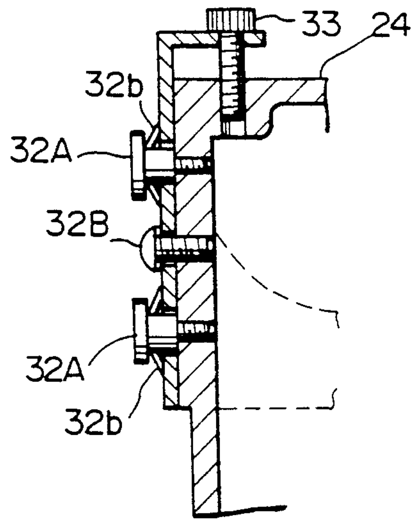
FIG. 8B is a section along line B—B of FIG. 8A.

As shown in FIGS. 3 and 8A, a feeler 112 is mounted on the boss 110 of the support unit 11. A home sensor 31 is mounted on the stationary member 24 of the copier body and implemented by a photoelectric transducer. The home sensor 31 is responsive to the position of the support unit 11 which is associated with the 1:1 magnification. When the feeler 112 blocks the optical path of the home sensor 31, the home sensor 31 produces an output (high level) indicating that enlargement inclusive of 1:1 magnification occurs. Conversely, when the feeler 112 unblocks the optical path, the home sensor 31 produces an output (low level) indicating that reduction occurs. A bracket 32 has an upper end bent at right angle and supports the home sensor 31 thereon. The bracket 32 has guide pins 32A which are received in a slot 32*a* that extends in the intended direction of movement of the support unit 11. As shown in FIG. 8B, the bracket 32 is pressed against the stationary member 24 by the guide pins 32A and washers 32A which are implemented as Belleville springs. An adjusting screw 33 extends throughout the upper end of the bracket 32 and parallel to the direction of movement of the support unit 11. The correspondence of the bracket 32 and home sensor 31 is adjustable by driving the adjusting screw 33. After the adjustment, a screw 32B provided on the same side as the guide pins 32A will be driven to accurately position the bracket 32 relative to the home sensor 31. It is noteworthy that while the bracket 32 is adjusted, the bracket 32 is constantly urged against the stationary member 24 by the washers 32*b*, i.e., the bracket 32 is prevented from moving away from the stationary member 24 when the screw 32B is loosened. Hence, when the screw 32B is tightened again, the bracket 32 is prevented from being dislocated by a moment of rotation. This allows the home sensor 31 on the bracket 32 to be positioned accurately relative to the feeler 112.

Figure 9:
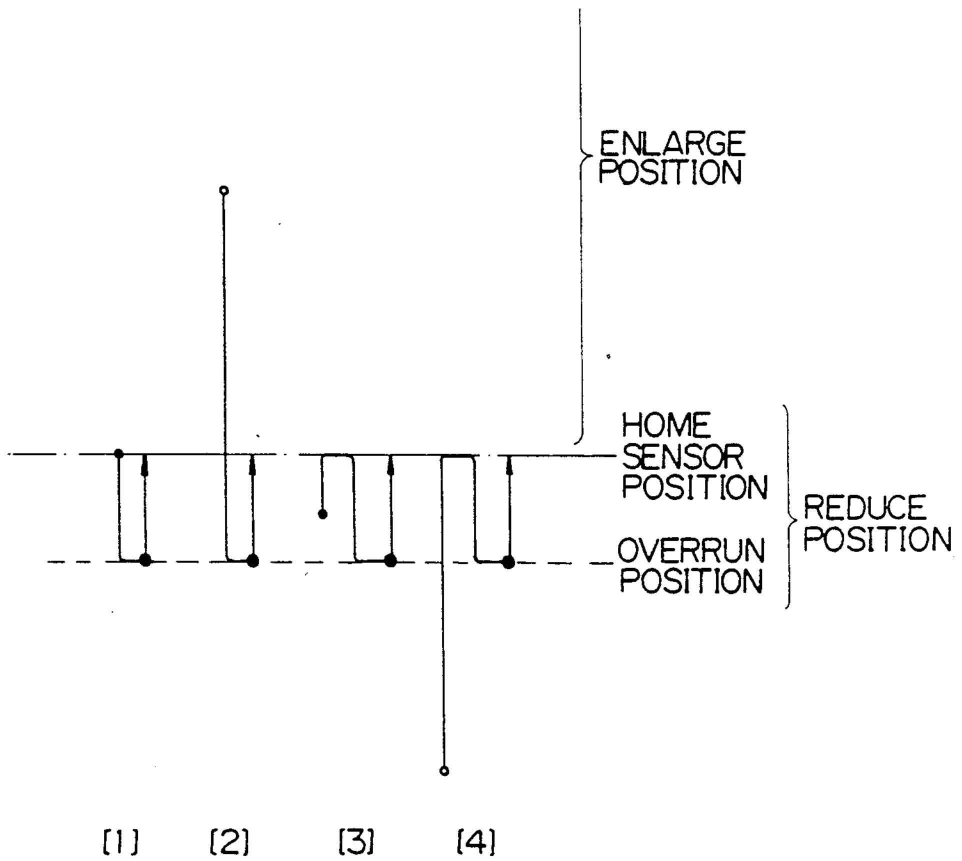
FIG. 9 is a diagram demonstrating the operation of the drive mechanism shown in FIG. 5.

The control over the reversible motor 19 which drives the support unit 11 as stated previously will be described with reference to FIGS. 9 and 10. In the illustrative embodiment, the position of the support unit 11 associated with the 1:1 magnification and sensed by the home sensor 31 is selected to be the initial position where the support unit 11 starts its movement. When the support unit 11 starts moving at a certain position different from the initial position, it is once returned to the initial position and then moved to a position matching a desired magnification. In FIG. 9, [1], [2], [3] and [4] are representative of the positions of the support unit 11 which are associated with 1:1 magnification, enlargement, reduction, and overrun, respectively. The support unit 11 in any of the positions [1] to [4] is moved in one direction and then stopped in order to compensate for the backlash of a gear train particular to a mechanism for driving this kind of movable body and the hysteresis of the home sensor 31, i.e., to maintain the returning conditions to the home position constant.

Concerning the positions [3] and [4], the support unit 11 is returned to the initial position, then moved to the overrun position, and then moved toward the initial position again. Such a sequence is successful in eliminating errors which are apt to occur in the relative position of the feeler 112 and home sensor 31 depending on the moving direction of the support unit 11. Specifically, in FIG. 9, the support unit 11 moves from the enlargement position [2] to the initial position in one direction and from the reduction position [3] to the initial position in the opposite direction. Especially, when the support unit 11 moves in the direction of gravity, the operating speed of the home sensor 31 at the instant when the unit 11 aligns with the home sensor 31 is apt to vary due to the difference in oscillation, for example. The resulting variation in acceleration effects the tension acting on the cog belt 15 and, therefore, the amount of stretch of the cog belt 15. As a result, the support unit 11 is apt to stop at an unexpected position other than the initial position. In the light of this, the illustrative embodiment adopts the above-stated principle in moving the support unit 11 to the initial position. Such a double action, i.e., returning the support unit 11 to the initial position, the moving it away from the initial position, and then returning it again to the initial position will not be necessary if the moving speed of the unit 11 is reduced or if the amount of overrun is increased. This, however, increases the operating time. The unique movement of the support unit 11 stated above will also prove effective when use is made of a metal wire or similar wire which is apt to stretch.

Figure 10:
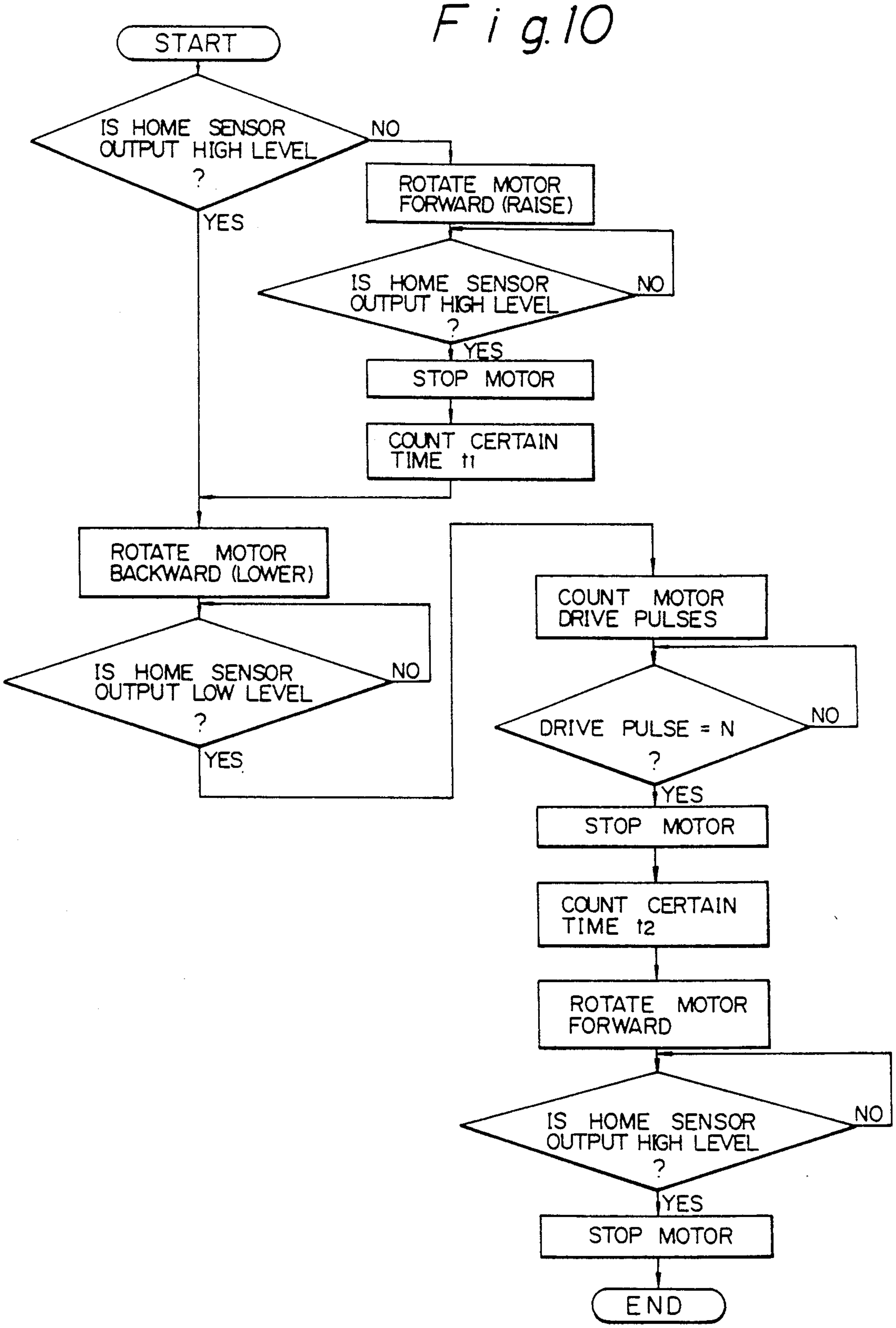
FIG. 10 is a flowchart representative of the operation of the drive mechanism shown in FIG. 5.

FIG. 10 shows a control routine for controlling a driver, not shown, which drives the motor 19. As shown, when the output of the home sensor 31 is in a high level, meaning that the support unit 11 is in the 1:1 magnification position or the enlargement position, the motor 19 is rotated backward to lower the support unit 11 until the output of the home sensor 31 turns to a low level. Conversely, when the output of the home sensor 31 is in a low level, meaning that the support unit 11 is in the reduction position, the motor 19 is driven forward to raise the support unit 11 until the sensor output turns to a high level. As soon as the sensor output turns to a high level, the support unit 11 is held in a halt for a certain period of time, i.e., a period of time corresponding to the access time for processing particular to the driver (about 10 milliseconds to 50 milliseconds). Then, the motor 19 is rotated backward until the sensor output turns to a low level. In this manner, after the output of the home sensor 31 has turned to a low level, the rotation of the motor 19 is reversed and then stopped within a certain period of time. In this instance, the amount of overrun may be selected from a range of 0.5 millimeters to 5 millimeters, and it is selected to be 2 millimeters in the illustrative embodiment. To suppress errors ascribable to mechanical vibrations, after the support unit 11 has been stopped for the above-mentioned period of time, the motor 19 is driven forward until the output of the home sesnor 31 turns to a high level.

Figure 11:
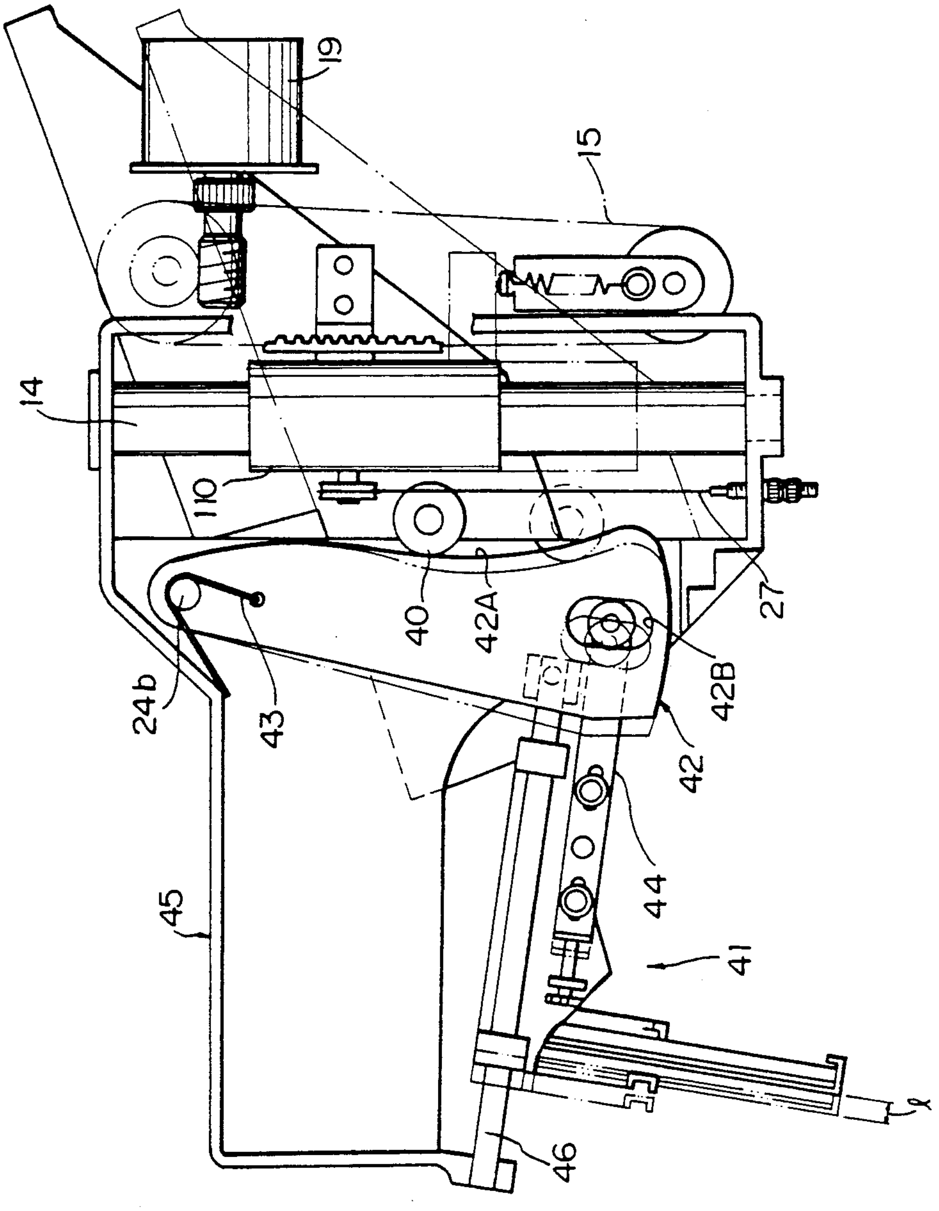
FIG. 11 is a fragmentary side elevation of the illustrative embodiment.

As shown in FIG. 3, a roller 40 is rotatably mounted on a shaft which extends sideways from the side wall of the support unit 11 on which the boss 110 is provided. As shown in FIG. 11, the roller 40 abuts against a cam face 42A of a cam 42 which drives a second mirror support unit. The cam 42 is rotatably supported by a shaft 24*b* which is studded on the stationary member 24. A helical spring 43 is anchored at one end to the stationary member 24 and at the other end to the cam 42, whereby the cam 42 is constantly biased counterclockwise by the spring 43 as viewed in FIG. 11. The cam face 42A of the cam 42 which abuts against the roller 40 is so configured as to bring the second mirror 4E to a predetermined position which is associated with the amount of movement of first mirror support unit 11. For example, when the support unit 11 is moved from a position indicated by a solid line in FIG. 11 to a position indicated by a dash-and-dots line, the cam face 42A displaces the second mirror 4E to retract perpendicularly to its reflecting surface toward a position which is indicated by a dash-and-dots line and over a distance l.

Figure 12:
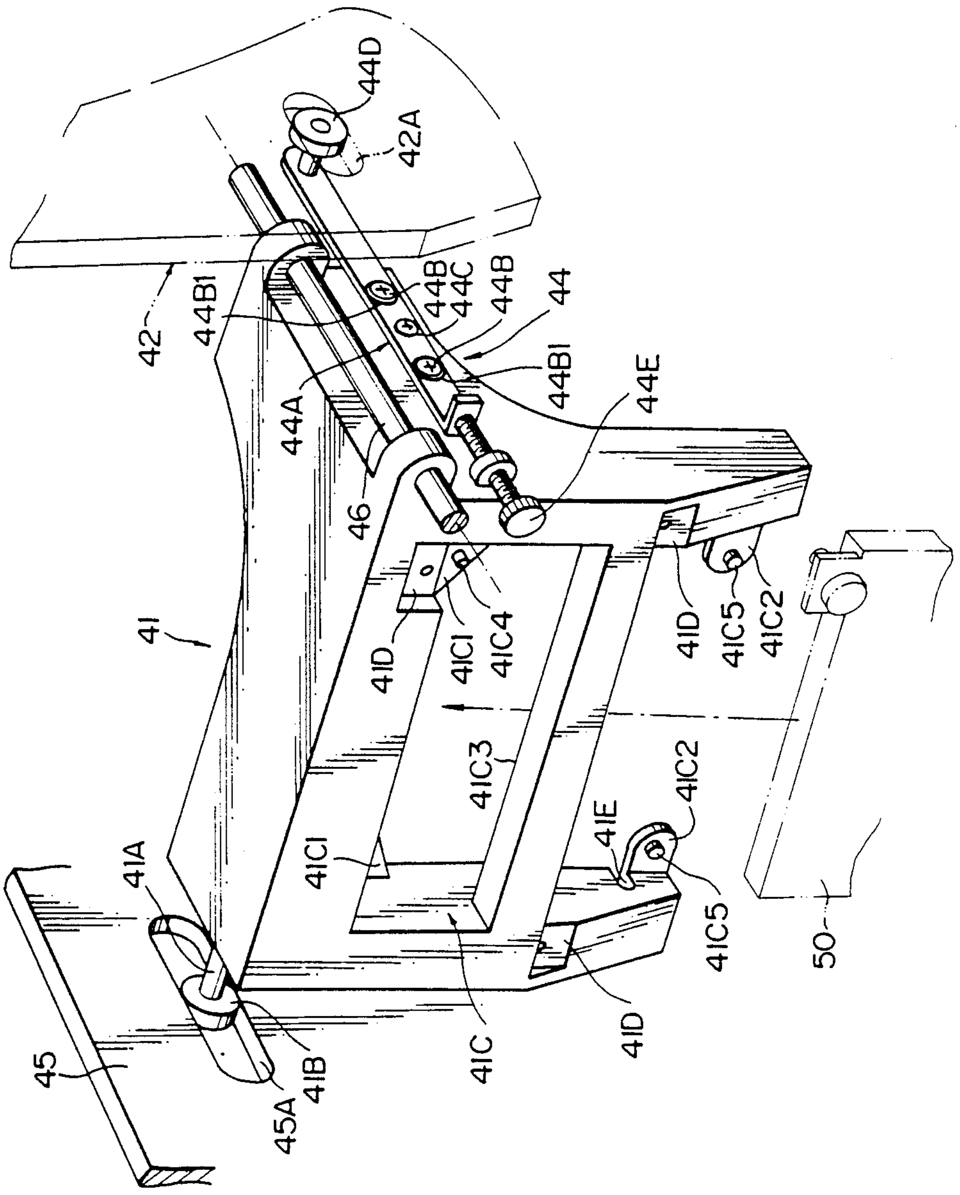
FIG. 12 is a perspective view of a structure for supporting a second mirror as shown in FIG. 11.

A slot 42B is formed through a free end portion of the cam 42 which is remote from the shaft 24*b*. Extending in the radial direction of the cam 42, the slot 42B is associated in position with a cam follower 44 which is included in a second mirror support unit 41. Specifically, a bracket 45 is disposed in the copier body and supports the support unit 41. The bracket 45 supports opposite ends of a guide rod 46 which extends perpendicularly to the reflecting surface of the second mirror 4E. As shown in FIG. 12, one of opposite widthwise ends of the support unit 41 is slidably mounted on the guide rod 46. A shaft 41A extends from the other widthwise end of the support unit 41 and carries a rotatable roller 41B at its end. The roller 41B rolls in a slot 45A which is formed through a wall of the bracket 45 and parallel to the guide rod 46. The cam follower 44 is mounted on one side wall of the support unit 41 adjacent to the guide rod 46 and is slidable in the axial direction of the guide rod 46.

The cam follower 44 has an elongate slidable plate 44A which extends in the axial direction of the guide rod 46. The plate 44A is slidably mounted on the support unit 41 by guide pins 44B, washers 44B1 implemented as Bellville springs, and a fixing screw 44C. The guide pins 44B are individually passed through slots of the plate 44A each of which extends in the sliding direction of the plate 44A. The washers 44B1 are interposed between the guide pins 44B and the plate 44A. The screw 44C, like the guide pins 44B, is passed through a slot of the plate 44A. A roller 44D is mounted on one end of the plate 44A and received in the slot 42A of the cam 42. The cam follower 44 prevents the plate 44A from being dislocated when the screw 44C is tightened after adjustment, as in the positioning structure described with reference to FIG. 7. The relative position of the roller 44D and the slot 42A of the cam 42 is adjustable by manipulating an adjusting screw 44E which is positioned on the other end of the plate 44A.

In FIG. 12, the support unit 41 is provided with a structure for supporting the second mirror 4E. Specifically, the support unit 41 has a supporting portion 41C provided on the frame which has a surface perpendicular to the guide rod 46, and a fixing portion 41D for fixing a mirror cassette 50 after the latter has been positioned in the supporting portion 41C. The mirror cassette 50 is loaded with the second mirror 4E. The supporting portion 41C has three abutment surfaces 41C1, 41C2 and 41C3 assigned respectively to the upper end, the lower end and the intermediate between the upper and lower ends of the mirror 4E. Screws 41C4 are positioned at opposite widthwise ends of the upper abutment surface 41C1 and are accessible to adjust the angular position of the reflecting surface of the mirror 4E loaded in the mirror cassette 50. Pins 41C5 protrude from opposite widthwise ends of the lower abutment surface 41C2 toward the reflecting surface of the mirror 4E so as to position the reflecting surface, which defines a reference point for the adjustment of the angular position of the mirror 4E.

Figure 13:
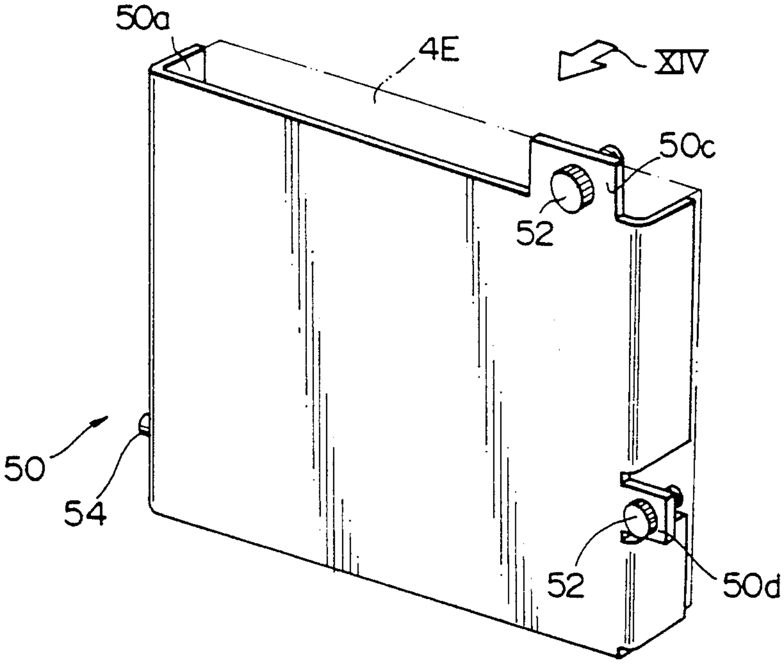
FIG. 13 is a fragmentary perspective view of a second mirror mounting structure included in the arrangement of FIG. 12.
Figure 14:
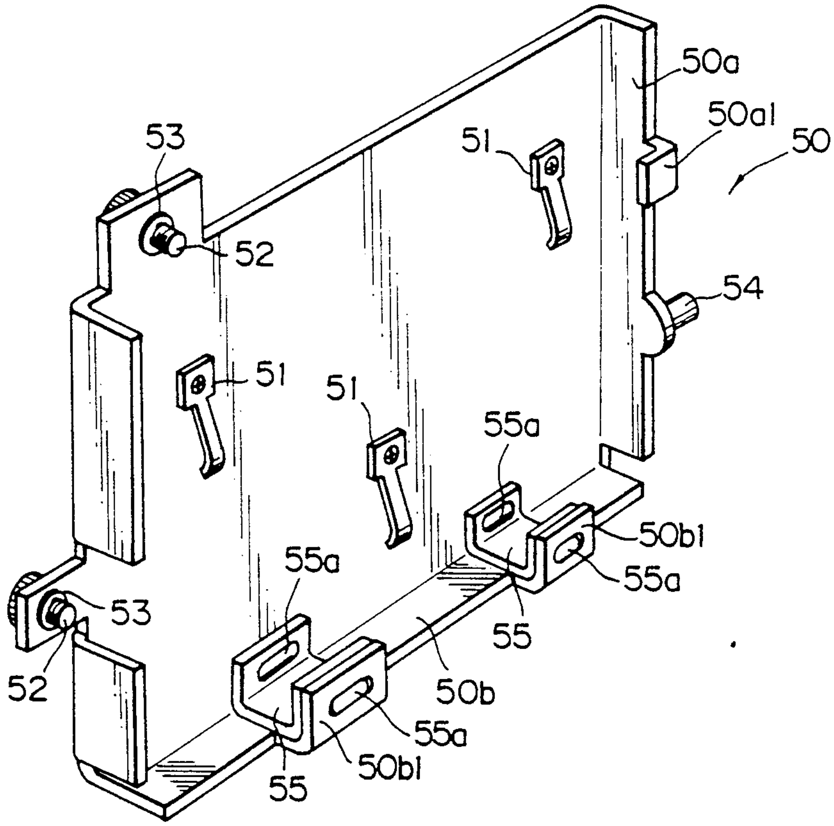
FIG. 14 is a view as seen in a direction indicated by an arrow XIV in FIG. 13.

Referring to FIGS. 13 and 14, the mirror cassette 50 associated with the second mirror 4E is shown in detail. As shown, the mirror cassette 50 has a box-like configuration which is so removed as to expose the upper edge and reflecting surface of the second mirror 4E. Upright walls 50*a* and 50*b* extend from those edges of the mirror cassette 50 which correspond to one side edge and lower edge of the mirror 4E. Leaf springs 51 are affixed to the bottom of the mirror cassette 50 to urge the mirror away from the bottom. Angled retaining pieces **50*a*1 and 50*b*1 are respectively formed on the walls 50*a* and 50*b* to retain the reflecting surface of the mirror 4E which is biased away from the cassette 50 by the leaf springs 51 as mentioned above. The bottom of the mirror cassette 50 is extended to form projections 50*c* and 50*d* at its edges which correspond to the other side edge and upper edge of the mirror 4E. Screws 52 are respectively retained by the projections 50*c* and 50*d* with the intermediary of E-rings 53. The screws 52 are individually engageable with threaded holes 41D, FIG. 12, which are formed in the fixing portion 41C of the mirror unit 41**.

A pin 54 extends outward from the upright wall **50*a* of the mirror cassette 50, while the support unit 41 has a recess 41E, FIG. 12, for receiving the pin 54. The second mirror 4E is securely mounted on the mirror cassette 50 by top-open channel-like clamping members 55 which are individually fitted between the bottom of the cassette 50 and the angled retainers 50*b*1. Specifically, each clamping member 55 has a bead-like lug 55*a*, while each retainer 51*b*1 has an opening for receiving the lug 55*a*. The mirror 4E is fixed in place by mating the lugs 55*a* with the openings of the retainers 51*b*1**.

In the above construction, the amount of projection of the pin 24, FIG. 6, may be varied to adjust the position of the other widthwise end of the support unit 11, inclusive of the position of the optical axis.

Assume that the mirror unit 11 loaded with the first mirror 4C and positioned as stated above is moved in matching relation to a selected magnification, e.g., a magnification for reduction. Then, the motor 19 moves the support unit 11 to the initial position as described with reference to FIGS. 9 and 10, and then the displacement represented by the solid curve of FIG. 2 is set. Hence, as the motor 19 is rotated, the belt pulley 16 is rotated counterclockwise via the worm gear 20 and worm wheel 18 to in turn lower the tooth member 110A which is meshed with the cog belt 15. As a result, the support unit 11 is moved to a reduction position matching with the magnification perpendicularly to the document surface.

As shown in FIG. 3, when the support unit 11 supporting the first mirror 4C is lowered, the lens support portion 11B integral therewith is also lowered. At this instant, the lens holder 12 is moved parallel to the optical axis extending from the mirror 4C through the cam follower **12*b* along the configuration of the cam slot 13A. The downward movement of the support unit 11 further causes the roller 40 mounted thereon to move downward, so that the cam 42 abutting against the roller 40 is rotated about the shaft 24*b*. As a result, the roller 44D of the cam follower 44 which is received in the slot 42B of the cam 42 is displaced to in turn displace the second mirror 4E mounted on the support unit 41 perpendicularly to the reflecting surface of the mirror 4E. Such a replacement is represented by the distance l in FIG. 11**.

In summary, it will be seen that the present invention provides optics for an image forming apparatus which causes its optical members, especially a first mirror and a lens located at the rear of the first mirror, to move in association with each other for thereby reducing the displacement of the individual optical members. This reduces the exclusive space which the optics occupies in the apparatus and, therefore, the overall dimensions of the apparatus. Since the lens is movable along with the first mirror, it is needless to drive it by an exclusive driving section and this further promotes the reduction in the size of the apparatus. Even when the drive transmission member associated with the mirror and lens is implemented by an elastic member, the movement of the mirror and lens is accurately controlled because the position can be sensed without errors ascribable to the stretch of the transmission member.

Further, in accordance with the present invention, the first mirror and a second mirror located at the rear of the first mirror are interlocked with each other, and the second mirror is movable perpendicularly to the reflecting surface thereof. This reduces the exclusive range necessary for the movement of such optical members and, therefore, the exclusive space to be allocated to the optics, whereby the image forming apparatus is further miniaturized.

A support unit movably supporting the first mirror is cantilevered with a drive mechanism being located at one of opposite widthwise ends of the support unit. The cantilevered support unit is suspended at the other widthwise end and is adjustable in position at this end. Therefore, when the support unit is inclined in the widthwise direction due to the deviation of the center of gravity thereof or positional errors, the optical axis of the first mirror is prevented from being dislocated and, further, smooth movement is insured against play.

Various modifications will become possible for those skilled in the art after receiving the teachings of the present disclosure without departing from the scope thereof.

What is claimed is:

1. Optics for an image forming apparatus having optical members for projecting a reflection from an image surface of a document onto a photoconductive element and comprising a plurality of mirrors and a lens interposed between said plurality of mirrors, said optical members being displaceable in response to a change of magnification, said optics comprising:

a first mirror for reflecting the reflection from the document prior to the other mirrors;

a first mirror support member for supporting said first mirror;

a lens support member for supporting said lens, said lens support member being located rearwardly of said first mirror support member;

a second mirror located adjacent to the photoconductive element with respect to said lens support member;

a second mirror support member for supporting said second mirror; and first means for moving said first mirror support member and said first mirror supported thereon in a direction parallel to an optical axis of the reflection and moving said lens support member and said lens supported thereon in a direction of movement of said first mirror support member by an amount associated with a ratio which is produced from an amount of movement of said first mirror support member;

said first mirror support member comprising second means for moving said second mirror support member and said second mirror supported thereon in a direction perpendicular to a surface of said second mirror in response to the movement of said first mirror support member.

2. Optics as claimed in claim 1, further comprising a first mirror support unit comprising a casing for retaining said first mirror and the lens thereinside, said lens support member being movable to a predetermined position in association with said first mirror.

3. Optics as claimed in claim 1, wherein said first means comprises a stepping motor for driving said first mirror and the lens, said first mirror and said lens starting moving at a same start position with no regard to magnification.

4. Optics as claimed in claim 3, further comprising sensing means located in a position corresponding to said start position for sensing said start position.

5. Optics as claimed in claim 1, wherein said first means comprises a cantilevered drive mechanism provided on one side of said first mirror support member.

6. Optics as claimed in claim 5, wherein said drive mechanism comprises:

pulleys individually located at a cantilevered portion of said drive mechanism and a position opposite to said cantilevered portion with respect to an optical path of said first mirror;

a wire passed over said pulleys and suspending said drive mechanism at said position opposite to said cantilevered portion; and a tension adjusting member connected to one end of said wire for adjusting tension of said wire.

7. Optics as claimed in claim 1, wherein said first mirror support member and said second mirror support member comprise:

resilient members affixed to a mirror mounting surface of said first and second mirror support members at apexes of an imaginary triangle and abutting against a back of one of the plurality of mirrors associated therewith for biasing said mirror mounted thereon away from said mirror mounting surface; and a restricting member provided on a member which faces said resilient members with the intermediary of said mirror and engageable with a reflecting surface of said mirror for setting an angle of inclination of said mirror being biased by said resilient members.

8. Optics as claimed in claim 7, wherein said second mirror support member further comprises a projection provided in a position of said mirror support member corresponding to an edge of the mirror and extending toward said edge of said mirror.

9. Optics as claimed in claim 8, wherein said projection is made of a material having greater hardness than a body of said mirror support member.

10. Optics as claimed in claim 2, wherein said first mirror support unit comprises means for intercepting light at a surface thereof where the lens is located, said means for intercepting light defining tooth-like projections.

11. Optics as claimed in claim 1, wherein said second means for moving said second mirror support member comprises a roller means mounted on said first mirror support member which cooperates with a camming mechanism associated with said second mirror support member.

12. Optics as claimed in claim 1, wherein said lens support member is moved in a direction of light reflected from said first mirror in accordance with a magnification.

13. Optics for an image forming apparatus having optical members for projecting a reflection from an image surface of a document onto a photoconductive element and comprising a plurality of mirrors and a lens interposed between said plurality of mirrors, said optical members being displaceable in response to a change of magnification, said optics comprising:

a first mirror for reflecting the reflection from the document prior to the other mirrors;

a first mirror support member for supporting said first mirror;

a lens support member for supporting said lens, said lens support member being located rearwardly of said first mirror support member;

a second mirror located adjacent to the photoconductive element with respect to said lens support member;

a second mirror support member for supporting said second mirror; and first means for moving said first mirror support member and said first mirror supported thereon in a direction parallel to an optical axis of the reflection and moving said lens support member and said lens supported thereon in a direction of movement of said first mirror support member by an amount associated with a ratio which is produced from an amount of movement of said first mirror support member;

said first mirror support member comprising second means for moving said second mirror support member and said second mirror supported thereon in a direction perpendicular to a surface of said second mirror in response to the movement of said first mirror support member;

wherein said first means comprises a cantilevered drive mechanism provided on one side of said first mirror support member;

said drive mechanism comprising:

pulleys individually located at a cantilevered portion of said drive mechanism and a position opposite to said cantilevered portion with respect to an optical path of said first mirror;

a wire passed over said pulleys and suspending said drive mechanism at said position opposite to said cantilevered portion; and a tension adjusting member connected to one end of said wire for adjusting a tension of said wire.

* * * * *